US012724511B1

(12) United States Patent
Hu et al.

(10) Patent No.: US 12,724,511 B1
(45) Date of Patent: Sep. 1, 2026

(54) HUMAN-MACHINE INTERFACE SYSTEM AND METHOD

(71) Applicant: Kostal of America, Inc., Troy, MI (US)

(72) Inventors: Zhiping Hu, Troy, MI (US); Xiaozhong Duan, Troy, MI (US)

(73) Assignee: Kostal of America, Inc., Troy, MI (US)

(*) Notice: Subject to any disclaimer, the term of this patent is extended or adjusted under 35 U.S.C. 154(b) by 0 days.

(21) Appl. No.: 19/188,410

(22) Filed: Apr. 24, 2025

(51) Int. Cl.
*G06F 3/041* (2006.01)

(52) U.S. Cl.
CPC ........ *G06F 3/04166* (2019.05); *G06F 3/0414* (2013.01)

(58) Field of Classification Search
CPC ........................... G06F 3/04166; G06F 3/0414
See application file for complete search history.

(56) References Cited

U.S. PATENT DOCUMENTS

2015/0091858 A1* 4/2015 Rosenberg .......... G06F 3/04144 345/174
2021/0164812 A1 6/2021 Adeyemi et al.
2025/0179843 A1* 6/2025 Rettenberger .......... E05F 15/75

* cited by examiner

*Primary Examiner* — Robert J Michaud
(74) *Attorney, Agent, or Firm* — Gunther J. Evanina; BUTZEL LONG

(57) ABSTRACT

Systems and methods for accurately interpreting user input to a human-machine interface in real time involve computing a moving average force or strain value from a sensor, computing a standard deviation of the moving average force or strain value, and generating a control signal responsive to a recognized pattern of standard deviation peaks and moving average force or strain values between the standard deviation peaks.

10 Claims, 5 Drawing Sheets

HUMAN-MACHINE INTERFACE SYSTEM AND METHOD

FIELD OF THE DISCLOSURE

This disclosure relates generally to human-machine interfaces (HMIs), and more particularly to systems and methods of reliably correlating force or strain sensor data associated with user manipulation of a user input surface of a HMI with a control signal corresponding to the user manipulation.

BACKGROUND OF THE DISCLOSURE

It has become common to utilize force and/or strain sensors in HMI to detect user commands and generate an appropriate control signal. In many applications, such as in manufacturing process control systems, touch screens can provide a multitude of controls such as buttons, sliders and text fields that are intuitive, user-friendly, and allow direct interaction with displayed information. An advantage with large touch screen HMIs is that translating user manipulation into the desired control signal is relatively simple, generally requiring only a determination of where the touch screen has been touched by the user. Drivers of motor vehicles (e.g., cars and trucks) must generally have their attention focused on traffic. Consequently, manipulation of large touch screens can be distracting and dangerous while driving a motor vehicle. In vehicle applications it can often be more desirable to provide a single HMI that can be easily felt and operated without distracting the driver's eyes from traffic and road conditions. Rather than requiring touching of specific areas of a screen, the user may use different types of manipulations of a single user surface, such as push, pull, yaw, roll, pitch, multiple force levels, multiple taps, etc. However, with this somewhat more complicated range of manipulations, more sophisticated systems and methods are desired to accurately determine the type of user manipulation on the user input surface and the associated control signal being requested by the user.

Additionally, such methods and systems for motor vehicle applications must be more robust to account for various environmental noises that can be caused by temperature changes, humidity changes, vibrations, and electrical interference, factors that are more easily avoided and managed in more controlled environments such as a factory control room.

SUMMARY OF THE DISCLOSURE

The described HMI systems employ a user input surface, a sensor associated with the user input surface for detecting a force or strain applied to the user input surface, and a microcontroller electrically connected to and in communication with the sensor to receive a force or strain value or reading from the sensor. The microcontroller is configured to compute a moving average force or strain value as a function of time, a standard deviation of the moving average force or strain value as a function of time, to recognize a pattern of standard deviation peaks and moving average force or strain values between the standard deviation peaks, and generate a control signal based on the recognized pattern.

The disclosed methods include steps of collecting strain or force sensor output signals or readings, computing or a moving average force or strain value as a function of time and a standard deviation of the moving average force or strain value as a function of time, recognizing a pattern of standard deviation peaks and moving average force or strain values between the standard deviation peaks, and generating a control signal based on the recognized pattern.

DETAILED DESCRIPTION

Force and/or strain detected by sensors at a user input surface are subjected to various environmental noises, including temperature changes, vibrations, and electrical interferences.

In addition to accounting for environmental noises, recognition of a user input must be accurate, efficient and rapidly evaluated, while minimizing microcontroller memory and computing resources.

The methods disclosed herein compute a moving average of the detected force or strain over a predetermined period of time. For example, a force or strain signal can be measured and recorded over a time period (T), with each measurement taken at a time ($t_i$) and with the time interval between measurements being $\Delta t=t_m-t_{m-1}$, with $n\Delta t=T$.

The moving average (μ) can be set equal to the sum of measurements ($X_i$) over the time period divided by the number of measurements (n):

$$\mu = \frac{\sum^{n} x_i}{n}$$

The moving average and standard deviation can, for example, be calculated over a short (moving window) period of time (e.g., a fraction of a second) at a sampling rate of tens to thousands of discrete readings per second. Techniques other than arithmetic mean may be employed to characterize the moving average. For example, a numeric integration technique may be employed to obtain a moving average of the detected force or strain value over the moving window.

Additionally, the methods disclosed herein, concurrent with computation of the moving average, compute a standard deviation (σ) for the measurements ($X_i$):

$$\sigma = \sqrt{\frac{\sum (X_i - \mu)^2}{N}}$$

Figure 1:
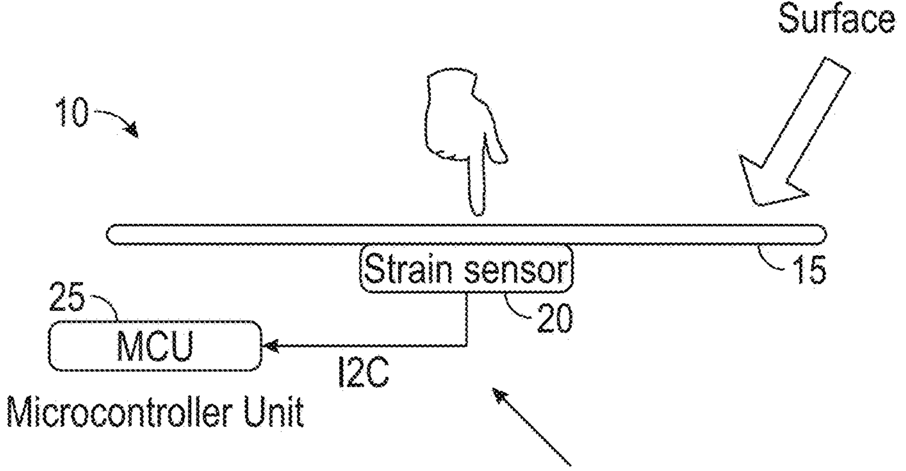
FIG. 1 is a diagram of a human-machine interface.

Shown in FIG. 1 is an exemplary HMI 10 having a user input surface 15 and an associated strain sensor 20 (or force sensor) that is in communication with a microcontroller unit 25 using, for example, a two-wire serial communication (I2C) protocol having a serial data line and a serial clock line. While the illustrated user input surface is flat, it will be understood that other shapes, such as a joystick grip, can be used that allow a variety of user input manipulations, such as yaw, roll, pitch and pull, in addition to press.

Figure 2:
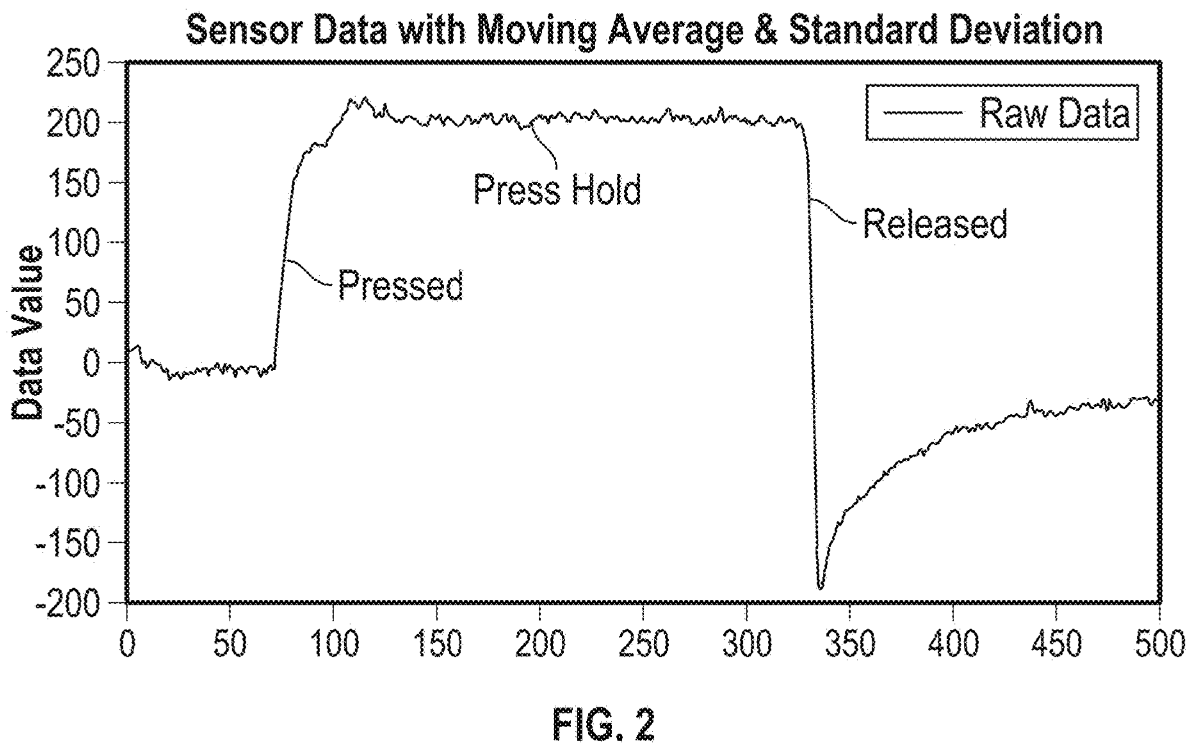
FIG. 2 is a graph of force or strain sensor output as a function of time when a user presses a user input surface of the human-machine interface, holds for a brief period of time, and releases (removes pressure from the user input surface).
Figure 3:
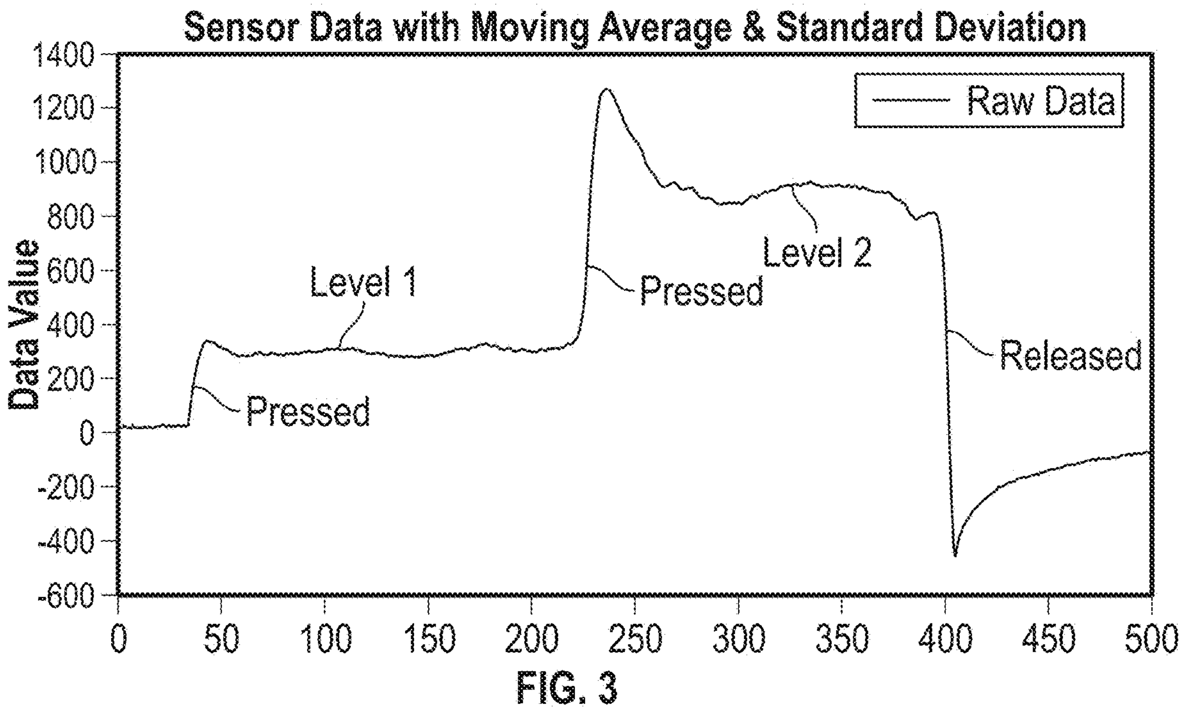
FIG. 3 is a graph of force or stain sensor output as a function of time when a user presses on a user input surface of the human-machine interface and holds at a first pressure for a first period of time, then presses harder and holds at a second pressure for a second period of time, and then releases (removes pressure from the user input surface).

FIGS. 2 and 3 show raw data output from sensor 20. Because of environmental factors and long-term baseline drift, it is desirable to process the raw data before attempting to interpret it.

Figure 4:
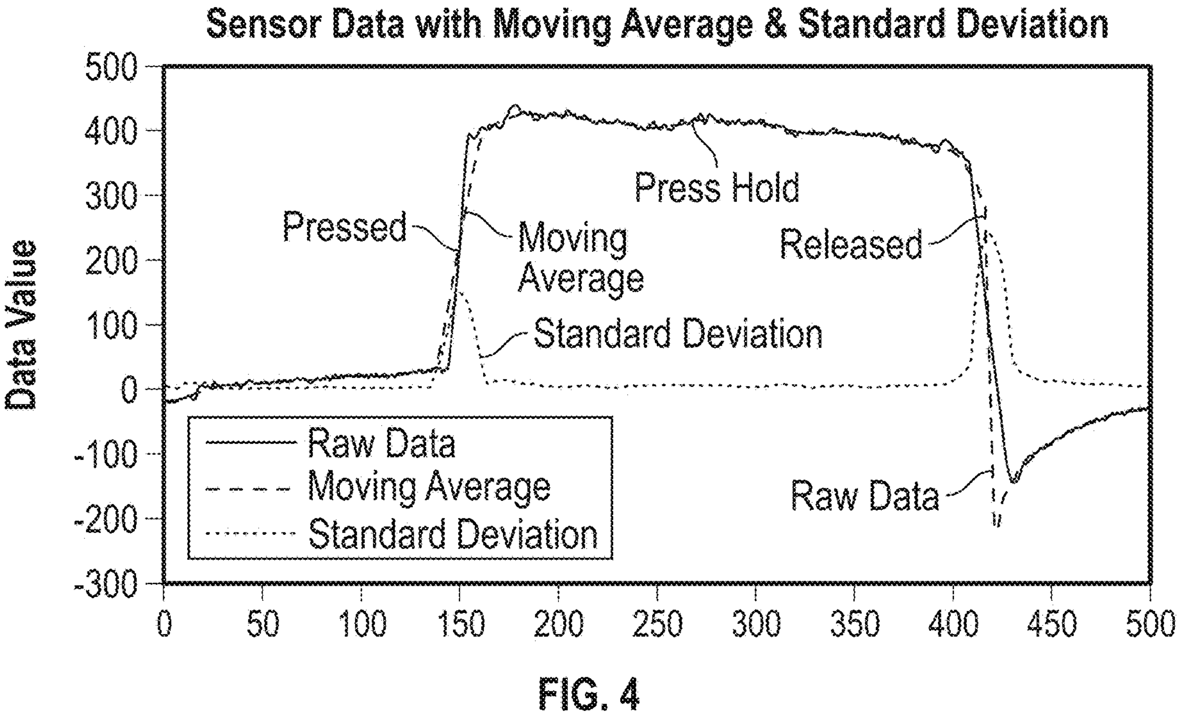
FIG. 4 is a graph showing the moving average of the force of strain sensor output of FIG. 2 as a function of time and the standard deviation of the moving average as a function of time, both superimposed over the raw sensor output from FIG. 2.
Figure 5:
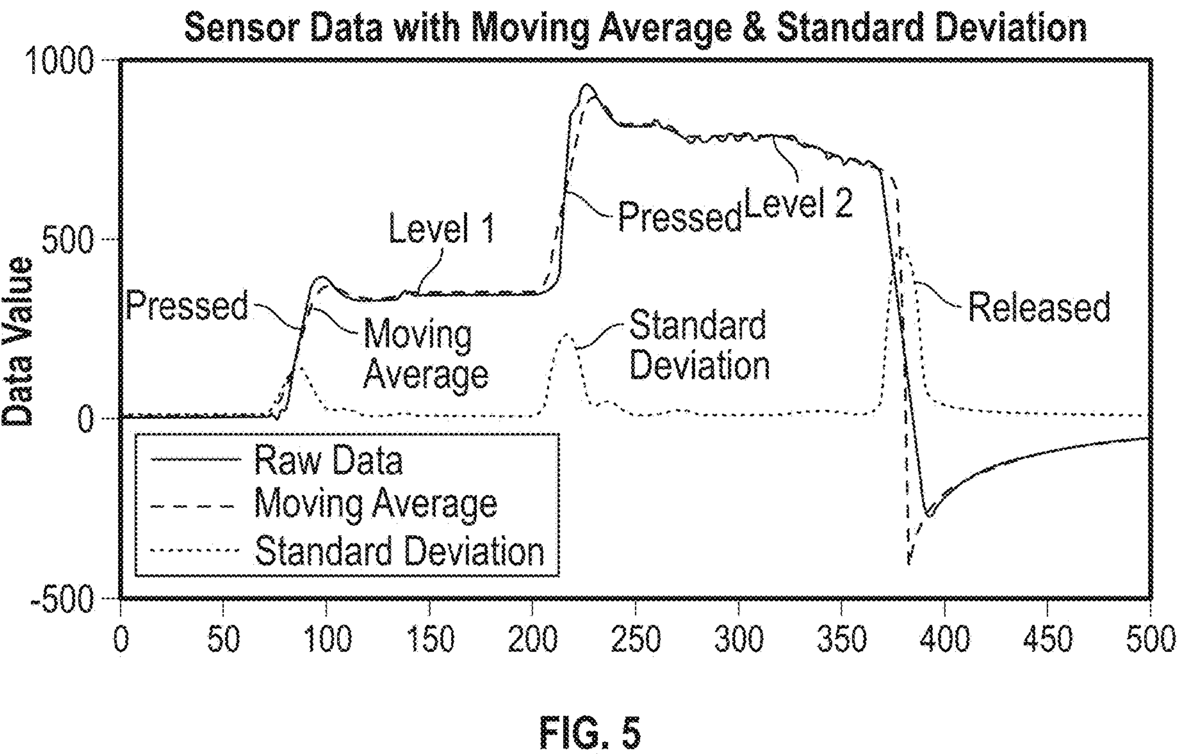
FIG. 5 is a graph showing the moving average of the force and strain sensor output of FIG. 3 as a function of time and the standard deviation of the moving average as a function of time, both superimposed over the raw sensor output of FIG. 3.

As can be seen in FIGS. 4 and 5, when a user presses, changes pressure, or releases pressure from the user input surface, the computed standard deviation (indicated by dotted lines) changes significantly to create standard deviation peaks that mark the beginning, end, and any transitions in user manipulation of the user input surface of the HMI. The computed moving averages (indicated by dashed lines) smooth out spikes seen in the raw sensor output (solid lines), which can be caused by vibrations, temperature fluctuations, electrical interferences, etc. The microcontroller processes the raw sensor output to generate standard deviation peaks with relatively flat standard deviation between the standard deviation peaks. The microprocessor is configured to recognize the pattern of standard deviation peaks and moving averages to generate a specific control signal based on the recognized pattern. For example, a single press or tap can be associated with a user request for a first control signal, and a double tap can be associated with another control signal. The systems and methods of this disclosure are capable of accurately recognizing numerous user manipulations and combinations of user manipulations of the user input surface to facilitate control over various vehicle systems, such as climate control, entertainment, information, and lighting systems.

Figure 6:
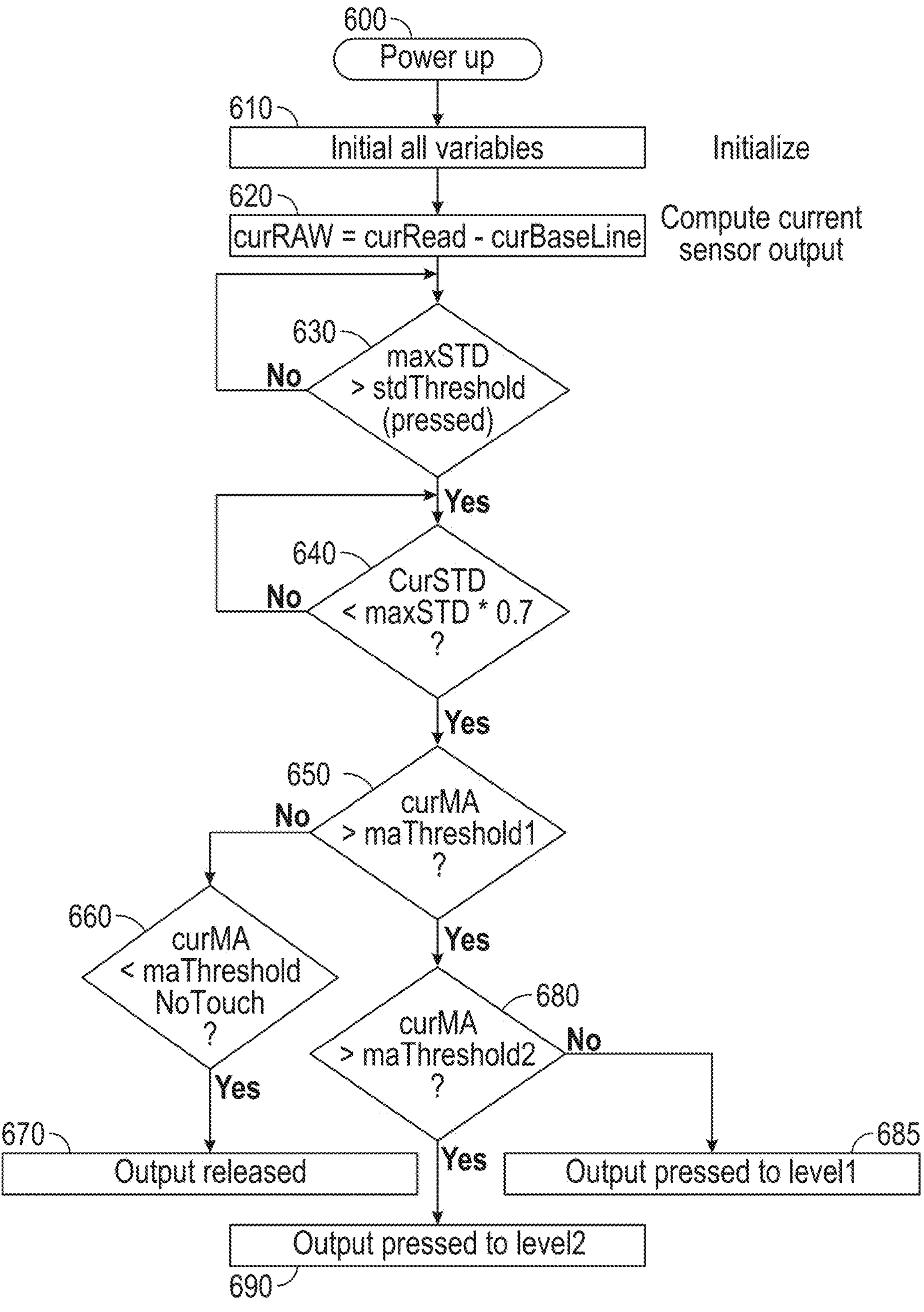
FIG. 6 is a method flowchart that shows steps for detecting and identifying a user input event.

An exemplary method in accordance with this disclosure is illustrated schematically in FIG. 6. At step 600, the system is powered up, and at step 610, variables are initialized. At step 620, the current sensor re-baselined raw value ("cur RAW") is set equal to the difference between the current reading of the sensor value ("cur Read") and the current sensor baseline value ("Cur BaseLine"). At step 630, a determination is made whether the current maximum sensor standard deviation value ("max STD") is greater than the sensor standard deviation threshold ("std Threshold") (touched). If "yes", then go to step 640, otherwise step 630 is repeated. At step 640, a determination is made whether the current sensor standard deviation value ("cur STD") is less than a scaling factor (e.g., 0.7) times the current maximum sensor standard deviation value. If "yes", then go to step 650, otherwise step 640 is repeated. At step 650, a determination is made whether the current sensor moving average value ("Cur MA") is greater than a first (level 1) threshold value ("ma Threshold1"). If "yes", then go to step 680, if "no", then go to step 660. At step 660, a determination is made whether the current sensor moving average value is less than the threshold value of no touch. If "yes", then go to step 670 and output signal of "released" that the user has released force or strain on the user input surface. At step 680, a determination is made whether the current sensor moving average value is greater than a second (level 2) threshold value ("ma Threshold2") that is greater than the first threshold value. If the determination (at step 680) is "no," the method signals (at step 685) that the user has applied a level 1 pressure to the user input surface. If the determination (at step 680) is "yes," then the method signals (at step 690) that the user has applied a level 2 pressure to the user input surface.

Figure 7:
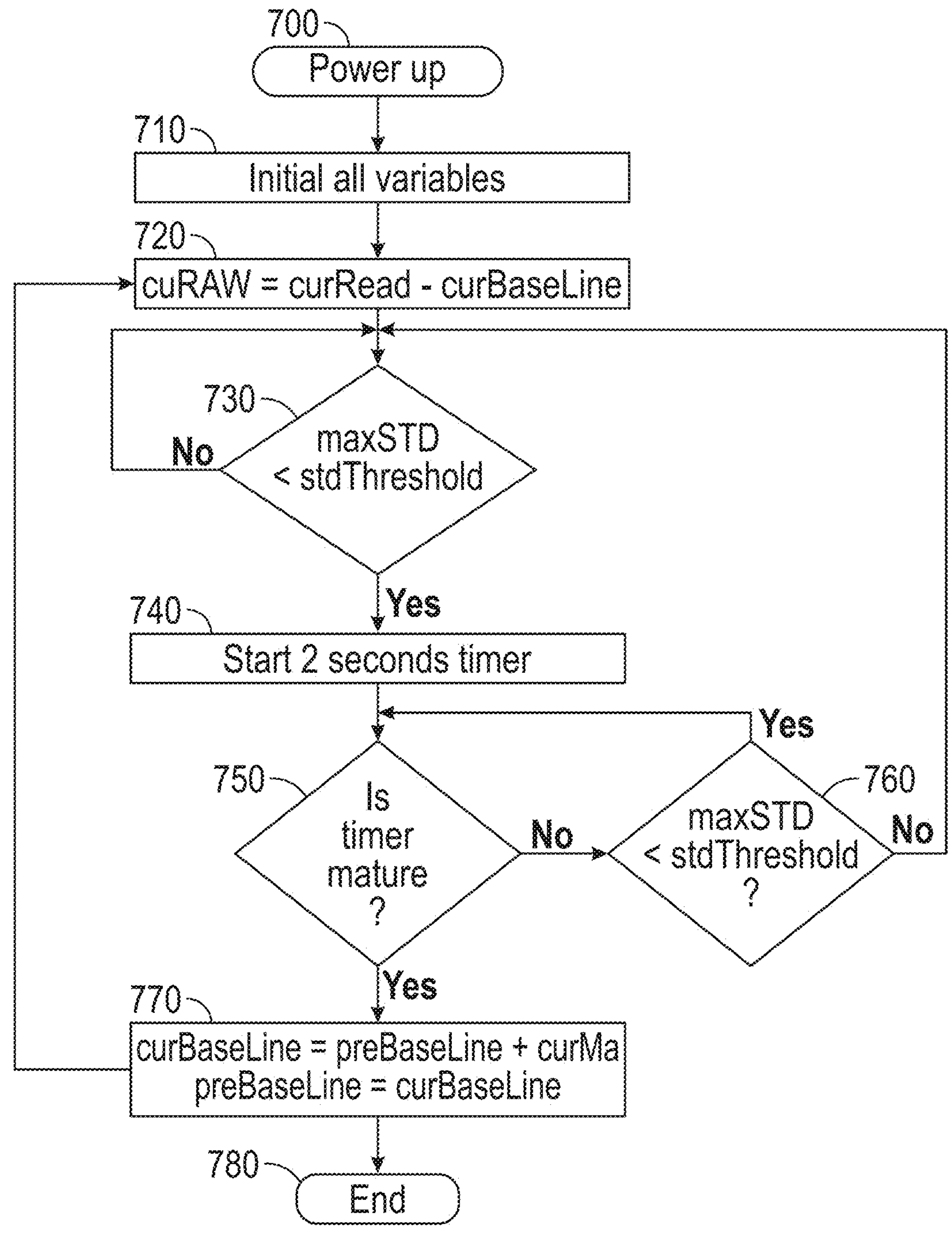
FIG. 7 is an alternative method flowchart that shows steps for detecting and identifying a user input event employing a dynamic re-baselining technique.

A second exemplary method in accordance with this disclosure is illustrated schematically in FIG. 7. In the method of FIG. 7, dynamic re-baselining technique is employed to filter out signal drifting that can occur during longer periods of time due to environmental factors such as temperature changes, vibration, and electrical interferences. Dynamic re-baselining uses the standard deviation to determine non-event time during which a reset of signal output can be applied. At step 700, the system is powered up, and at step 710, variables are initialized. At step 720, the current sensor re-baselined raw value ("cu RAW") is set equal to the current reading of the sensor value ("Cur Read") minus the current sensor baseline value ("cur BaseLine"). At step 730, a determination whether the current maximum sensor standard deviation value ("max STD") is less than a threshold of "no touch" that means the not any touch by the user. If "yes", means no touch event, then go to step 740, otherwise step 730 is repeated. At step 740, a timer is started (wait a period of time of no touch event). A determination whether the elapsed time since the timer was started exceeds a prescribed period of time (e.g., 2 seconds) is determined at step 750. If the determination (at step 750) is "no," then go to step 760. At step 760, a determination whether the current maximum sensor standard deviation value is less than the sensor standard deviation threshold of "no touch", if "yes", then go to step 750 to wait the timer is mature, and otherwise go to step 730 to wait no touch event occur. If the determination (at step 750) is "yes," the current sensor baseline value is set equal to the sum of the previous sensor baseline value ("pre BaseLine") plus the current sensor moving average value ("cur Ma"), and the previous sensor baseline value is set equal to the current sensor baseline value (at step 770). Thereafter, the method ends (step 780) or returns to step 720.

The methods of this disclosure, including, but not limited to, the exemplary methods (FIGS. 6 and 7), include steps of maintaining a moving average of the force or strain sensor data to smooth out noise, computing standard deviation of the force or strain sensor data to detect a user input event, and using the moving average of the sensor data to identify the type of event. For example, the standard deviation peaks at about 150 and 420 on the timeline (x-axis) in FIG. 4 indicate the beginning and end of an event, and the magnitude of the moving average between the standard deviation peaks indicate that the user has pressed and held for a period of time on the user input surface. The press and hold input can, for example, be associated with a particular user desired control signal to operate climate control, lighting, information, entertainment or other systems (such as in an automobile). As another example, the standard deviation peaks at about 85, 220 and 380 on the time line (x-axis) in FIG. 5 indicate the beginning, a transition, and an end of a user input event, and the moving average between the first two standard deviation peaks indicate that a user has pressed on a user input surface and maintained (held) pressure at a first level (level 1) for a first period of time. The moving average between the second and third standard deviation peaks indicate that the user has pressed harder to a second level (level 2) and held at that second level for a second period of time, before releasing. This sequence of user applied pressure at a first level and a second level followed by release can be associated with another user desired control signal.

The method disclosed has advantages to detect and identify any user input events that are carried through force or strain sensors. By using moving average and standard deviation, the method can accurately detect the event in real-time and effectively identify the kind of event. Through dynamic re-baseline procedure, the method can resolve signal drift issue that is normally exiting in force or strain sensors. Dynamic re-baseline assures the sensor signal quality to make the event detection and identification robust and stable.

The above description is intended to be illustrative, not restrictive. The scope of the invention should be determined with reference to the appended claims along with the full scope of equivalents. It is anticipated and intended that future developments will occur in the art, and that the disclosed devices, kits and methods will be incorporated into such future embodiments. Thus, the invention is capable of modification and variation and is limited only by the following claims.

The invention claimed is:

1. A human-machine interface system, comprising:

a user input surface;

a sensor associated with the user input surface for detecting a force or strain applied to the user input surface; and a microcontroller in electrical communication with the sensor to receive a force or strain value from the sensor, the microcontroller configured to determine a moving average force or strain value as a function of time, the moving average force or strain value computed over a sliding time window, the microcontroller configured to compute a standard deviation of the moving average force or strain value as a function of time, the microcontroller configured to generate a control signal responsive to a recognized pattern of standard deviation peaks and moving average force or strain values between the standard deviation peaks.

2. The human-machine interface system of claim 1, wherein the sensor is a strain sensor.

3. The human-machine interface system of claim 1, wherein the sensor is a force sensor.

4. The human-machine interface system of claim 1, wherein the moving average force or strain is an arithmetic mean of discrete values sampled over a period of time window less than one second.

5. The human-machine interface system of claim 1, wherein the sensor force or strain value is subjected to dynamic re-baselining.

6. A process for interpreting user manipulations on a user input surface of a human-machine interface, comprising:

collecting strain or force sensor output;

computing a moving average force or strain value as a function of time;

computing a standard deviation of the average force or strain value as a function of time; and generating a control signal responsive to a recognized pattern of standard deviation peaks and moving average force or strain values between the standard deviation peaks.

7. The process of claim 6, wherein the sensor output is strain values.

8. The process of claim 6, wherein the sensor output is force values.

9. The process of claim 6, wherein the moving average force or strain is an arithmetic mean of discrete values sampled over a time window less than one second.

10. The process of claim 6, wherein the sensor force or strain value is subjected to dynamic re-baselining.

* * * * *